US008534983B2

(12) United States Patent
Schoenfeld et al.

(10) Patent No.: US 8,534,983 B2
(45) Date of Patent: Sep. 17, 2013

(54) DOOR BREACHING ROBOTIC MANIPULATOR

(75) Inventors: Erik Emerson Reid Schoenfeld, Malden, MA (US); Lawrence Parrington, Rexford, NY (US); Stephan Von Muehlen, Brooklyn, NY (US); Seth Frader-Thompson, Brooklyn, NY (US)

(73) Assignees: iRobot Corporation, Bedford, MA (US); Honeybee Robotics Ltd., New York, NY (US)

( * ) Notice: Subject to any disclaimer, the term of this patent is extended or adjusted under 35 U.S.C. 154(b) by 292 days.

(21) Appl. No.: 12/406,100

(22) Filed: Mar. 17, 2009

(65) Prior Publication Data

US 2009/0317223 A1 Dec. 24, 2009

Related U.S. Application Data

(60) Provisional application No. 61/036,989, filed on Mar. 17, 2008.

(51) Int. Cl.
*E02F 3/00* (2006.01)
*E02F 3/413* (2006.01)

(52) U.S. Cl.
CPC .................................. *E02F 3/4135* (2013.01)
USPC .......................................................... 414/739

(58) Field of Classification Search
USPC ................... 414/680, 729, 739, 800; 901/1, 901/15, 31; 294/106
See application file for complete search history.

(56) References Cited

U.S. PATENT DOCUMENTS

| 3,414,137 | A  | * | 12/1968 | Fortin ................................ 414/7 |
|---|---|---|---|---|
| 5,443,354 | A  | * | 8/1995  | Stone et al. ..................... 414/729 |
| 6,578,893 | B2 | * | 6/2003  | Soucy et al. ................... 294/99.1 |
| 7,125,059 | B2 | * | 10/2006 | Miyamoto ....................... 294/106 |
| 7,645,110 | B2 | * | 1/2010  | Ogawa et al. .................. 414/547 |
| 7,789,443 | B2 | * | 9/2010  | Gillespie et al. .............. 294/106 |
| 2009/0320637 | A1 | * | 12/2009 | Doyle et al. ............... 74/490.03 |
| 2010/0217436 | A1 | * | 8/2010  | Jones et al. ..................... 700/245 |
| 2010/0243344 | A1 | * | 9/2010  | Wyrobek et al. ................ 180/21 |

OTHER PUBLICATIONS

"Combined Arms Operations in Urban Terrain," [website page online]. *U.S. Army Field Manual FM* 3-06.11, Chapter 3, [retrieved on Aug. 5, 2009]. Retrieved from the Internet: <URL: http://www.globalsecurity.org/military/library/policy/army/fm/3-06-11/ch3.htm>.
Bibby, J., Necessary, R., Robonaut [website page online]. [retrieved on Aug. 5, 2009]. Retrieved from the Internet: <URL: http://robonaut.jsc.nasa.gov>.

(Continued)

*Primary Examiner* — Saul Rodriguez
*Assistant Examiner* — Brendan Tighe
(74) *Attorney, Agent, or Firm* — Myers Bigel Sibley & Sajovec, PA

(57) ABSTRACT

A door breaching robotic manipulator comprises: two fingers, each finger comprising a gripper surface at a distal end thereof, the gripper surfaces being spaced from each other by a predetermined distance; a cable configured to be actuated to drive the gripper surfaces toward each other; and a selectively compliant wrist comprising a U-joint and a magnetic coupling having a predetermined magnetic force strength. The magnetic coupling comprises a metal member and a magnetic element attracted thereto. When a force overcomes the predetermined magnetic force strength of the selectively compliant wrist, the wrist becomes compliant.

9 Claims, 4 Drawing Sheets

(56) References Cited

OTHER PUBLICATIONS

Bruemmer, D. J., Few, D.A., Kapoor, C., Goza, M., "Dynamic Autonomy for Mobile Manipulation," In Proc. Of the *ANS/IEEE 11th Annual Conference on Robotics and Remote Systems for Hazardous Environments*, Salt Lake City, UT, Feb. 12-15, 2006.

Rhee, C., Chung, W., Kim, M., Shim, Y., Lee, H., "Door opening control using the multi-fingered robotic hand for the indoor service robot," *Robotics and Automation, 2004. Proceedings. ICRA '04. 2004 IEEE International Conference*, pp. 4011-4016, vol. 4, Apr. 26-May 1, 2004.

Andreopoulos, A., Tsotsos, J.K., "A Framework for Door Localization and Door Opening Using a Robotic Wheelchair for People Living with Mobility Impairments," *RSS 2007 Manipulation Workshop: Sensing and Adapting to the Real World*, Atlanta, Jun. 30, 2007.

Murray, Sean et al., "Continued Research in EVA, Navigation, Networking and Communications Systems", SAE Proceedings, International Conference on Environmental Systems, Jun. 2008.

Yamauchi, Brian. "All-Weather Perception for Small Autonomous UGVs". In Proceedings of SPIE Defense and Security Conference, Orlando, FL, Mar. 2008.

Lenser, Scott et al., "Practical problems in sliding scale autonomy: A case study". In Proceedings of SPIE Defense and Security Conference, Orlando, FL, Mar. 2008.

Cheung, Carol et al., "UAV-UGV Collaboration with a PackBot UGV and Raven SUAV for Pursuit and Tracking of a Dynamic Target". In Proceedings of SPIE Defense and Security Conference, Orlando, FL, Mar. 2008.

Schoenfeld, Erik et al., "Door Breaching Robotic Manipulator". In Proceedings of SPIE Defense and Security Conference, Orlando, FL, Mar. 2008.

Yamauchi, Brian. "Daredevil: Ultra Wideband Radar Sensing for Small UGVs", In Proceedings of SPIE: Unmanned Systems Technology IX, Orlando, FL, Apr. 2007.

Rudakevych, Pavlo et al., "Integration of the Fido Explosives Detector onto the PackBot EOD UGV", In Proceedings of SPIE vol. 6561, Mar. 2007.

Rudakevych, Pavlo et al., "A man portable hybrid UAV/UGV system", In Proceedings of SPIE vol. 6561, Mar. 2007.

Jones, Chris et al., "Sentinel: An Operator Interface for the Control of Multiple Semi-Autonomous UGVs", In Proceedings of the Association for Unmanned Vehicles Systems International. Orlando, FL, Aug. 2006.

Yamauchi, Brian. "Autonomous Urban Reconnaissance Using Man-Portable UGVs", In Proceedings of SPIE: Unmanned Ground Vehicle Technology VIII, Orlando, FL, Apr. 2006.

Yamauchi, Brian. "Wayfarer: An Autonomous Navigation Payload for the PackBot", In Proceedings of AUVSI Unmanned Vehicles North America 2005, Baltimore, MD, Jun. 2005.

Barnes, Mitch et al., "ThrowBot: Design Considerations for a Man-Portable Throwable Robot", In Proceedings of SPIE vol. 5804, Mar. 2005.

Rudakevych, Pavlo et al., "PackBot EOD Firing System", In Proceedings of SPIE vol. 5804, Mar. 2005.

Yamauchi, Brian. "The Wayfarer Modular Navigation Payload for Intelligent Robot Infrastructure", In Proceedings of SPIE vol. 5804: Unmanned Ground Technology VII, Orlando, FL, Mar. 2005.

Yamauchi, Brian et al., "Griffon: a man-portable hybrid UGV/UAV", In Industrial Robot: An International Journal, vol. 31 No. 5, 2004.

Yamauchi, Brian. "PackBot: A Versatile Platform for Military Robotics", In Proceedings of SPIE vol. 5422: Unmanned Ground Vehicle Technology VI, Orlando, FL, Apr. 2004.

Sword, Lee et al., "Mobility Enhancements for Ballistically Deployed Sensors", In Proceedings of SPIE vol. 4393, Apr. 2001.

Rudakevych, Pavlo. "Wave Control: A Method of Distributed Control for Repeated Unit Tentacles", In Proceedings of SPIE vol. 3839, Aug. 1999.

Rudakevych, Pavlo et al., "Micro Unattended Mobility System (MUMS)", In Proceedings of SPIE vol. 3713, Jul. 1998.

\* cited by examiner

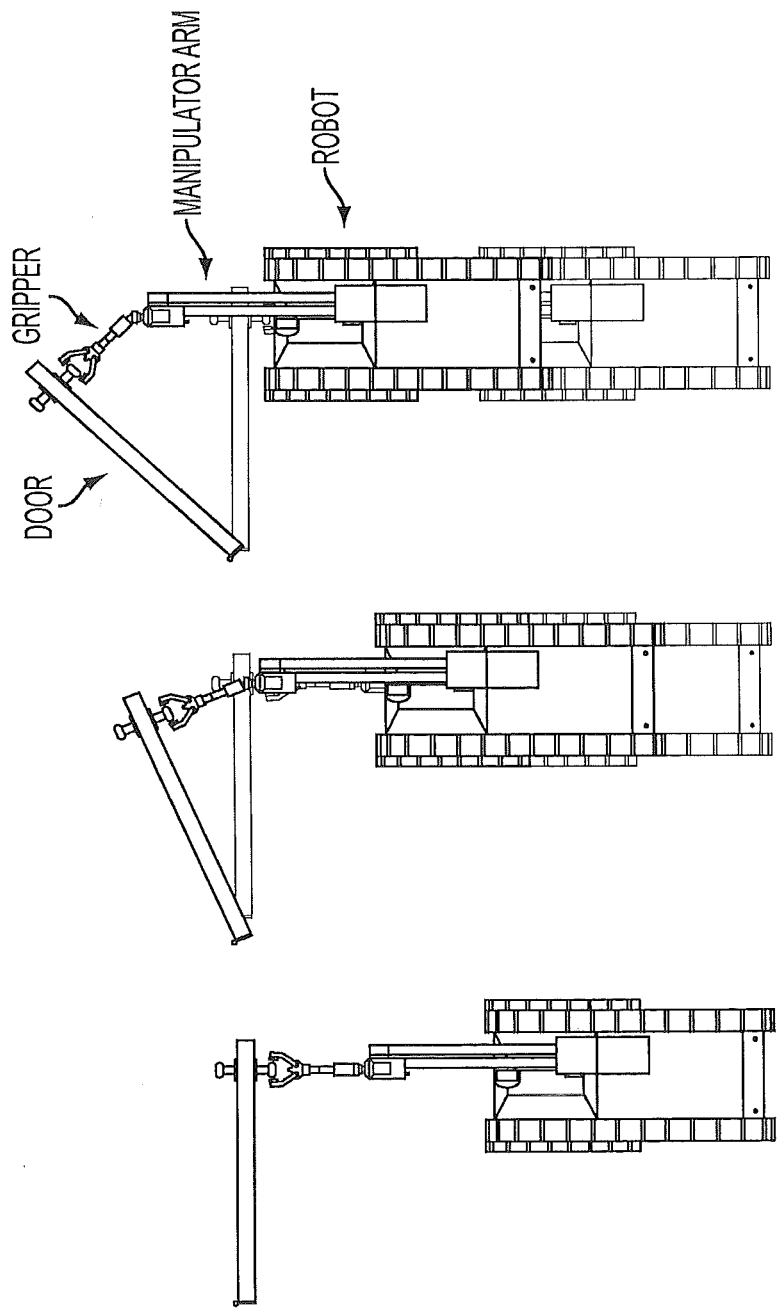

DOOR BREACHING ROBOTIC MANIPULATOR

This application claims priority to U.S. Provisional Patent Application No. 61/036,989, filed Mar. 17, 2008, the entire content of which is incorporated herein by reference.

INTRODUCTION

The present teachings relate to a door breaching manipulator, particularly for use with a remote vehicle such as an unmanned ground vehicle.

BACKGROUND

As unmanned systems such as remote vehicles become more commonplace in military, police, and other security forces, they are tasked to perform missions for which the original hardware was not designed. Many existing remote vehicles are built for rough outdoor conditions and have strong inflexible manipulators designed to handle a wide range of operations. These manipulators may not be well suited for some essential indoor tasks, including opening doors. Door opening is a complicated kinematic task that can challenge the remote vehicle and its operator.

When a human approaches a door they follow a subconscious routine developed though years of practice. The human spots the door and the latch mechanism and adjusts their gate to ensure that when they reach the door they will be leading with the proper foot. As they reach for the door knob or lever, their hand assumes a grapple pose correctly oriented to mate with the mechanism. Just before contact the hand slows its approach and closes on the knob or lever. Once the hand closes on the knob or lever, the wrist twists and the door is pushed open. The human arm's compliance allows the person to impart the force required to open the door without kinematically linking the body to the door. As a result, the person walks though on their path of choice while the door swings in an arc.

SUMMARY

The present teachings provide a door breaching robotic manipulator comprising: two fingers, each finger comprising a gripper surface at a distal end thereof, the gripper surfaces being spaced from each other by a predetermined distance; a cable configured to be actuated to drive the gripper surfaces toward each other; and a selectively compliant wrist comprising a U-joint and a magnetic coupling having a predetermined magnetic force strength. The magnetic coupling comprises a metal member and a magnetic element attracted thereto. When a force overcomes the predetermined magnetic force strength of the selectively compliant wrist, the wrist becomes compliant.

The present teachings also provide a robotic door breaching system comprising: a robot having an arm, a linear actuator, and a rotating actuator; and a door breaching robotic manipulator attached to a distal end of the robot arm and configured to be rotated by the rotating actuator. The door breaching robotic manipulator comprises a first finger having a gripper surface at a distal end thereof, a second finger having a gripper surface at a distal end thereof, a cable configured to be attached to the linear actuator and actuated to drive the gripper surfaces toward each other, and a selectively compliant wrist comprising a U-joint and a magnetic coupling having a predetermined magnetic force strength. The door breaching robotic manipulator is configured to be actuated by the linear and rotating actuators to grip and rotate a door knob or lever.

The present teachings further provide a method for breaching a door with a gripping manipulator attached to an arm of a remote vehicle, the method comprising: gripping a knob or lever of the door with the manipulator; rotating the manipulator to turn the knob or lever; and providing compliance at a wrist of the manipulator so that the remote vehicle can maintain a grip on the knob or lever while driving in a straight line to push or pull the door to an open position.

Additional objects and advantages of the present teachings will be set forth in part in the description which follows, and in part will be obvious from the description, or may be learned by practice of the present teachings. The objects and advantages of the invention will be realized and attained by means of the elements and combinations particularly pointed out in the appended claims.

It is to be understood that both the foregoing general description and the following detailed description are exemplary and explanatory only and are not restrictive of the present teachings or the claims.

The accompanying drawings, which are incorporated in and constitute a part of this specification, illustrate exemplary embodiments of the present teachings.

BRIEF DESCRIPTION OF THE DRAWINGS

FIGS. 3A-3C illustrate an exemplary embodiment of a door breaching robotic manipulator holding a door knob while the robot drives forward to open the door.

DESCRIPTION

Figure 1:
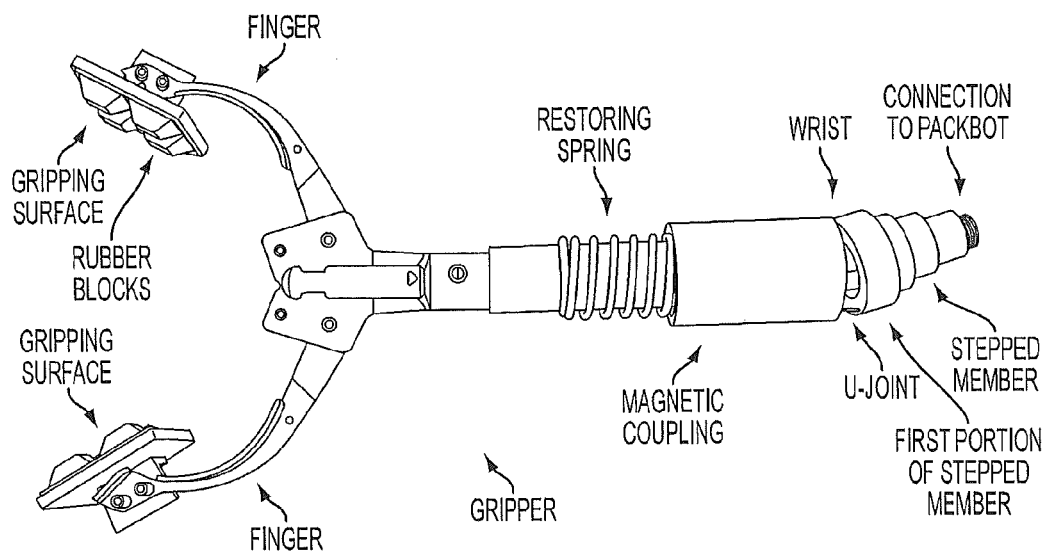
FIG. 1 illustrates an embodiment of a door breaching robotic manipulator in accordance with the present teachings.

Reference will now be made in detail to exemplary embodiments of the present teachings, examples of which are illustrated in the accompanying drawings. Wherever possible, the same reference numbers will be used throughout the drawings to refer to the same or like parts.

In accordance with certain embodiments, the present teachings comprise a modular door-breaching manipulator that simplifies the demands upon operator and a remote vehicle. The following description refers to a robot, but the present teachings apply to door breaching with a variety of remote vehicles. Typically, a manipulator or gripper in accordance with the present teachings can attach to an existing robotic arm, for example a manipulator arm of an iRobot PackBot EOD. The gripper can be optimized for grasping a variety of door knobs, levers, and/or car-door handles, and can work with a compliant "wrist" and magnetic lock-out mechanism that allow the wrist to remain rigid until the gripper has a firm grasp of the door handle or lever, and then bend during or after rotation of the door handle or lever, as the door swings open. Once the door is unlatched, the operator drives the robot through the doorway while the wrist compensates for the complex, multiple degree-of-freedom motion of the door. After the robot has opened the door and entered the doorway, the operator can release the door handle or lever, so that the wrist can pop back into place.

The PackBot EOD is a versatile, lightweight, easily deployed mobile robot originally designed for explosive ordnance disposal and detection and defeat of improvised explosive devices. Such a robot system can comprise an iRobot PackBot mobility platform, a two-meter OmniReach EOD arm, and the Portable Command Console (PCC) for robot control. The system can be all-digital, allowing for easy integration of new payloads and capabilities. The PackBot EOD includes two actuators a linear actuator and a rotating actuator. The PackBot can also include a camera, for example a forward-mounted camera that can be mounted to a gripper cartridge on a distal end of the robot arm proximate the gripper. The camera can provide an operator controlling the robot with a view of the door and its knob or lever.

Door breaching robots can allow soldiers to operate at greater standoff distances, because robots will be able to breach and inspect suspect buildings without placing a soldier in danger. In addition, door breaching robots can assist civilian chemical spill response teams. Although a given chemical spill response team individual may only be able to spend a few minutes on site because they overheat in their protective suits, a robot capable of opening doors and carrying appropriate sensors to the spill could spend several hours onsite while sending back a constant stream of video and sensor data. This would allow the team to speed their response by sending in a robot for inspection while they are setting up the decontamination equipment outside. Further, door opening is an enabling technology for elder care robotics. The ability to move from room to room to fetch items, render assistance, or simply follow around its master is a central part of the job.

FIG. 1 illustrates an exemplary embodiment of a door breaching robotic manipulator in accordance with the present teachings. The illustrated manipulator or gripper is can be utilized as a modular extension for a manipulator arm, such as that provided in an iRobot PackBot EOD. The present teachings contemplate easy field installation of the gripper onto an existing PackBot EOD arm, for example using a minimum number of tools in less than about 10 minutes.

In accordance with various embodiments of the present teachings, two features allow the gripper to provide improved door knob or lever manipulation. The first feature includes the shape, surface, and stance of the gripper fingers. The fingers of the gripper rest and move in a single plane, the rotational axis of the gripper wrist lying in that same plane, so that gripped objects are aligned with the rotational axis of the wrist when they are aligned between the gripper fingers. In contrast, the fingers of the standard PackBot EOD gripper do not rest and move in the same plane, and therefore cause the gripper's rotational axis to be offset from that of the object being gripped.

To open a door, after rotating the knob or lever to unlatch the door, the robot arm is required to translate while the knob or lever is held in the rotated (unlatching) position. Particularly with lever-type door handles, lateral motion of the robot arm can be required in addition to rotation, which can put stress on robot arm unless a certain amount of compliance is provided. Reducing the amount of translation, for example by providing a compliance mechanism within the gripper, can reduce stress on the robot arm and at the gripper/doorknob connection, thereby increasing door-opening performance. In accordance with the various embodiments of the present teachings, compliance of the gripper can be achieved by a compliant wrist. Such a wrist is illustrated in FIG. 1, and includes a magnetic coupling and a stepped member to which the magnets are attracted by a predetermined magnetic force. The magnetic coupling in the illustrated embodiment includes magnetic members held within a plastic sleeve. The magnet members exert a magnetic attraction force on at least the first portion of a stepped member. The size of the first portion of the stepped member and the strength of the magnets can be varied to achieve desired wrist compliance for the gripper.

Within the wrist is a U-joint that prevents the wrist from slipping during application of at least rotational forces to the knob or lever. The U-joint allows the rotational force applied by the rotating actuator to be applied to the door knob or lever being gripped and to be unlatched. Such rotating force can be applied via a base (not shown) connected to the rotating actuator and which mates with the door breaching robotic manipulator to translate the rotating force thereto. The U-joint prevents rotational forces from causing non-compliance at the wrist, which could prevent or lessen the rotation forces applied to the knob or lever to unlatch the door.

The illustrated exemplary manipulator/gripper embodiment also comprises a restoring spring to bias the magnetic coupling to a proper position relative to the stepped member. In accordance with certain embodiments, when the gripper is not attached to anything, the restoring spring is just strong enough to lift the gripper fingers (against gravity), straighten the wrist, and allow the magnets to (re)engage the stepped member. The restoring force of the spring can allow transfer of a certain amount of off-axis force, but such transfer does no inhibit door opening functionality for the illustrated gripper. In accordance with certain embodiments, the weight and length of the gripper fingers can be optimized so that the restoring force of the spring can be reduced and thus transfer of off-axis forces can be minimized.

In the illustrated exemplary embodiment, the gripper fingers can be closed (moved toward each other to grip a target) by actuating a cable that runs through the gripper. The cable is pulled by the linear actuator to close the gripper fingers. In the illustrated embodiment, the gripping surface of each gripper finger consists of four blocks or protrusions of rubber. The rubber may be relatively soft to provide friction and a degree of deformation when gripping an object. In accordance with the present teachings, the number, shape, and size of the rubber blocks can vary and can include, for example, one to six blocks. In accordance with certain embodiments, the gripping surface can be square and the size of the gripping surface can be, for example, about from one half inch to about one and a half inches square. However, the gripping surface may have a variety of shapes and sizes.

The illustrated four-block shape of the rubber pads in the exemplary embodiment of FIG. 1 provides perpendicular recesses between the blocks that can improve the gripper's grasp on the a door knob or lever, particularly through the door-opening process. This is because at least one of the recesses, when the gripping surface is pressed against the object being gripped, essentially pinches or presses the object between the blocks and into the recess to hold the object therebetween. The edges of the blocks can also act to trap the object in the recess to a certain degree.

As explained an illustrated below in detail, in order for a robot to drive in a straight line while pushing or pulling a door and grasping its knob or lever, there must be a degree of compliance in the wrist and slip in the connection between the gripper and the knob or lever. As the door swings open, the angle between the gripper and the knob or lever necessarily changes. The recesses between blocks of rubber in the illustrated embodiment allow the gripper to retain a hold on the knob or lever while the gripping surfaces slip and the angle between the gripper and the knob or lever changes as may be required for the robot to drive in a straight line while holding the knob or lever and pushing or pulling the door to open the door. With rounded doorknobs, all four rubber blocks of the illustrated gripping surface can press or pinch inwardly to hold a portion of the knob surface in the center of the gripper surface (where the perpendicular recess meet and maintain a grip on the knob even during slip of the gripper on the knob.

In various embodiments of the present teachings, the distance between gripper surfaces can be wider than that of a standard PackBot EOD gripper. This increased distance can simplify approach of the robot and gripper to the knob or lever, increasing an alignment tolerance between gripper and a knob or lever. Further, once the door has been opened, the increased distance between the gripping surfaces can reduce the chance of the gripper getting entangled on the knob or lever.

The compliance of the present teachings, which can be embodied in a simple wrist structure such as that illustrated in FIG. 1, allows for kinematic separation of the robot arm from the door and its knob or lever. Such kinematic separation can thus be achieved with a simple, light-weight, and low-cost design as compared with existing complex door breaching manipulator scenarios. This is because compliance in the wrist can obviate the need for compliance elsewhere in the gripper or arm, for example in finger portions. To push or pull doors while holding the door knob or lever in an unlatched position, the robot can simply drive forward or backward, without translating the arm to match or accommodate rotation of the door handle about the door hinges. Generally, the further a door handle is from the door hinge, the greater the compliance needed allow the robot to drive forward or backward to open the door without the robot needing to translating the arm to match or accommodate rotation of the door handle about the door hinges.

When a gripper embodiment such as that illustrated in FIG. 1 is utilized in accordance with the present teachings, the robot can simply rotate the gripper wrist about its axis of rotation to actuate a lever-type doorknob, and therefore the arm does not need to translate to accomplish downward movement of the lever. One skilled in the art will understand that unlatching lever-type doorknobs requires lateral and vertical motion in addition to rotation, and that such motion can be provided by the gripper fingers of the illustrated gripper moving in an arcuate path upon rotation. Additionally, the compliant wrist can facilitates proper unlatching of a lever-type doorknob by allowing the grippers to adjust their angle relative to the arm, and can accommodate misalignment when grabbing the door handle and the impact of jerky robot motion.

The ideal compliant wrist would transfer only torque and axial force (push/pull), but not off-axis force. Ideally this compliance could be switched on and off, and varied to some extent. For instance, zero compliance is best when positioning the gripper or performing other tasks unrelated to doors. Then, partial compliance is beneficial when closing the grippers, when gripper alignment may not be perfect. Once the doorknob is gripped, full compliance is desired to allow maximum separation of the robot arm from the door.

A wrist providing compliance for a gripper in accordance with the present teachings by utilizing a magnetic coupling can allow the gripper to turn the knob or lever and open the door in the following manner. The gripper transfers torque and axial force via the U-joint. One or more magnetic elements, such as for example magnetic inserts covered by or contained in a plastic sleeve as illustrated, can be provided at an end (in the illustrated embodiment, the end facing the stepped member). The magnetic inserts can surround the U-joint and can be magnetically coupled with a metal member such as the first portion of the stepped member to lock out the wrist compliance when the angle of the gripper does not need to change relative to the arm during door opening.

If and when a predetermined amount of off-axis force is applied to the gripper fingers, such as when the angle of the gripper must change relative to the arm during door opening, the force overcomes the strength of the magnetic coupling and the magnetic coupling breaks, allowing the stepped member to pivot to a certain degree relative to the magnetic coupling, thus giving the system the needed compliance. At this time, the u-joint can bend to accommodate the changed geometry of the wrist.

In accordance with various embodiments, if and when wrist compliance is no longer needed during door opening, the restoring spring can lift the gripper fingers (against gravity), straighten the wrist, and allow the magnets to reengage. The restoring force of the spring can be selected to minimize transfer of off-axis forces through the gripper. As stated above, the size of the first portion of the stepped member can be selected to achieve a desired wrist compliance for the gripper when combined with the magnetic coupling. The portion on the opposite end of the stepped portion can be sized to accommodate mating with the robot arm. On skilled in the art will appreciate that a variety of configurations can be used in place of the stepped member, and that such configurations can utilize various shapes and sizes to provide suitable magnetic interaction and mating with the robot arm.

Figure 2:
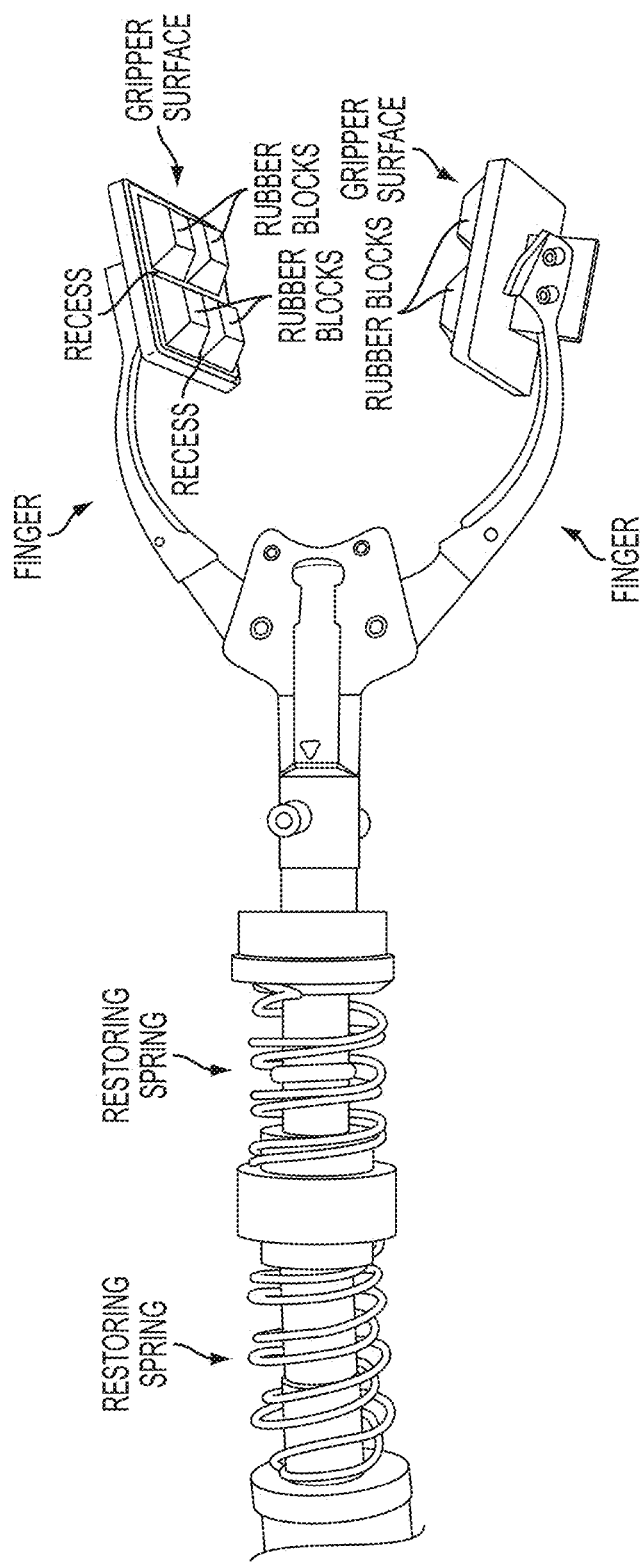
FIG. 2 is illustrates another embodiment of a door breaching robotic manipulator in accordance with the present teachings.

To provide increased range of motion for a door breaching robotic manipulator in accordance with the present teachings, a longer gripper comprising two U-joints and two restoring springs can be utilized in an embodiment such as illustrated in FIG. 2. An additional U-joint might decrease off-axis force transfer, but can increase the length and complexity of the door breaching robotic manipulator. Such a gripper can provide increased flexibility (compliance) to be combined with the compliance at the gripper wrist, for example for doors having a greater distance between the hinges and the knob or lever, without considerably weakening force translation through the manipulator (e.g., linear and rotational forces).

A robot having a door breaching robotic manipulator in accordance with the present teachings can be controlled by an operator utilizing operator control unit (OCU) configured for robot tele-operation and even initiation and monitoring of certain autonomous and/or semi-autonomous behaviors, for example the OCU disclosed in U.S. patent application Ser. No. 11/748,363, the entire disclosure of which is incorporated herein by reference.

Door Opening Procedure

For an operator to open a typical door with a robot having a door breaching robotic manipulator in accordance with the present teachings, the operator drives the robot into view of the door and its knob or lever. The operator can use video data from a camera mounted to the robot, for example on the arm proximate the gripper, to drive the robot into view of the door and its knob or lever. When the robot and its gripper get close enough to the door and are positioned so that the door can swing open without catching on the robot, the operator can place the arm in a proper pose (explained in more detail hereinbelow), preferably while the door breaching robotic manipulator is kept horizontal. Thus, the door breaching robotic manipulator is aligned vertically and horizontally with the knob or lever of the door to be opened. In certain embodiments, proper vertical and horizontal alignment of the door breaching robotic manipulator entails alignment of the knob's axis of rotation with the rotational axis of the door breaching robotic manipulator (so that the axes are collinear).

Figure 4C:
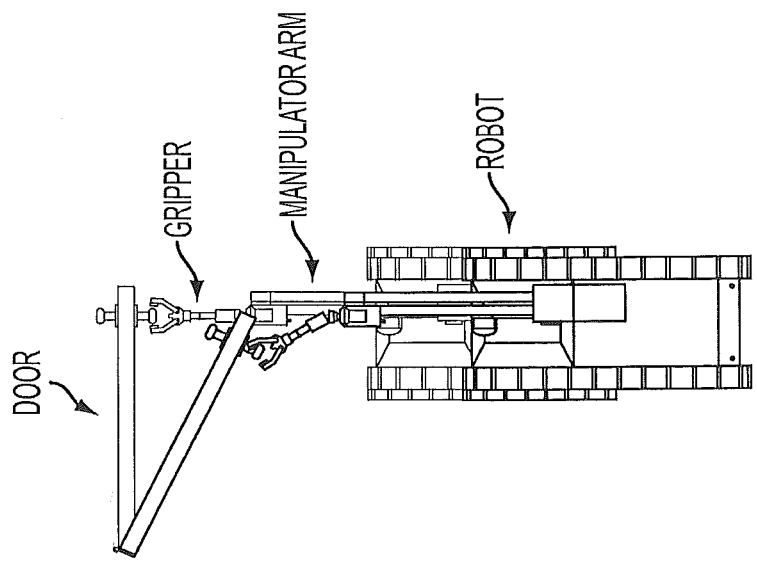
FIGS. 4A-4C illustrate an exemplary embodiment of a door breaching robotic manipulator holding a door knob while the robot drives backward to open the door.
Figure 4B:
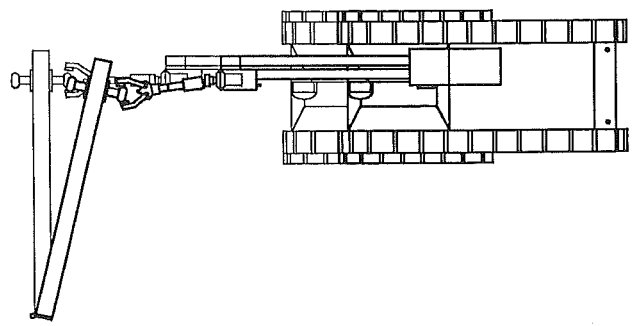
Figure 4A:
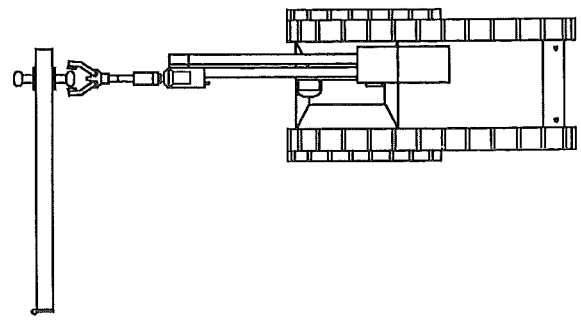

Once the knob's axis of rotation is aligned with the rotational axis of the door breaching robotic manipulator, the operator drives the gripper surfaces forward (using video data from the camera) so that the gripper surfaces surround knob at appropriate positions on either side of the knob. Thereafter, the linear actuator can be actuated to drive the gripper surfaces toward one another and the knob until the gripper surfaces are gripping the knob. Once the gripper surfaces are gripping the knob, the rotating actuator can be actuated to turn the door breaching robotic manipulator and therefore the knob to unlatch door. The robot can then move forward or backward accordingly to open the door. FIGS. 3A-3C illustrate an exemplary embodiment of a door breaching robotic manipulator holding a door knob while the robot drives forward to open the door. FIGS. 4A-4C illustrate an exemplary embodiment of a door breaching robotic manipulator holding a door knob while the robot drives backward to open the door.

While the robot is moving forward or backward to open the door, as illustrated in the exemplary embodiments of FIGS. 3A-3C and 4A-4C, the gripper surfaces may slide a bit on knob (as shown specifically in FIG. 3B for forward motion and FIGS. 4B and 4C for backward motion. Additionally, as the robot is moving forward or backward to open the door, forces will overcome the forces locking the wrist's magnetic coupling so that the wrist becomes complaint (see FIG. 3C and FIGS. 4B and 4C) as robot drives to swing door open while maintaining a grip on knob.

In certain embodiments of the present teachings, a click-to-grip behavior can be utilized to assist the operator in causing the door breaching robotic manipulator to grip a knob or lever. A click-to-grip behavior is disclosed in U.S. patent application Ser. No. 11/748,363, the entire disclosure of which is incorporated herein by reference.

The present teachings further contemplate that the linear and rotating actuators can be powered in a known way by the robot's power source. In addition, the present teachings contemplate using a device, such as an actuator, to selectively lock the wrist to prevent compliance that, as described above, can be caused by overcoming the magnetic coupling forces of the wrist.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A door breaching robotic manipulator configured to be attached to a manipulator arm of a robot, the door breaching robotic manipulator comprising:

two fingers, each finger comprising a gripper surface at a distal end thereof, the gripper surfaces being spaced from each other by a predetermined distance and comprising rubber blocks;

a selectively compliant wrist comprising a magnetic coupling having a predetermined magnetic force, and an adjacent stepped member having a first end to which the magnetic coupling is attracted; and a restoring spring in contact with the magnetic coupling and configured to bias the magnetic coupling toward the stepped member, wherein, when a force acting on the compliant wrist does not over the predetermined magnetic force strength of the magnetic coupling, the magnetic coupling does not separate from the stepped member and no compliance is created in the wrist, wherein, when the force acting on the compliant wrist overcomes the predetermined magnetic force strength of the magnetic coupling, the magnetic coupling separates from the stepped member, creating compliance in the wrist, and wherein, when the force acting on the compliant wrist no longer overcomes the predetermined magnetic force strength of the magnetic coupling, the restoring spring biases the magnetic coupling toward the stepped member to remove compliance created in the wrist by separation of the magnetic coupling from the stepped member.

2. The door breaching robotic manipulator of claim 1, wherein the two fingers rest and move in the same plane.

3. The door breaching robotic manipulator of claim 1, wherein at least one of the gripper surfaces comprises four blocks.

4. The door breaching robotic manipulator of claim 3, wherein the blocks are separated by perpendicular recesses.

5. The door breaching robotic manipulator of claim 1, wherein the predetermined distance between the gripper surfaces is greater than a diameter of a knob to be gripped by the door breaching robotic manipulator.

6. The door breaching robotic manipulator of claim 1, wherein the stepped member comprises a metal member to which the magnetic coupling is attracted.

7. The door breaching robotic manipulator of claim 6, wherein the stepped member is configured to mate at a second end with the manipulator arm of the robot.

8. The door breaching robotic manipulator of claim 7, wherein the second end of the stepped member is opposite the first end.

9. The door breaching robotic manipulator of claim 6, wherein the stepped member is configured to mate with the manipulator arm of the robot.

* * * * *